(12) United States Patent
Pedersen et al.

(10) Patent No.: US 9,208,447 B1
(45) Date of Patent: Dec. 8, 2015

(54) METHOD AND SYSTEM FOR CLASSIFYING VEHICLE TRACKS

(75) Inventors: Richard N. Pedersen, Toms River, NJ (US); Mark E. Barbustiak, Atco, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 352 days.

(21) Appl. No.: 13/617,879

(22) Filed: Sep. 14, 2012

(51) Int. Cl.
*G06N 5/02* (2006.01)
*G06N 99/00* (2010.01)

(52) U.S. Cl.
CPC ............ *G06N 99/005* (2013.01); *G06N 5/02* (2013.01)

(58) Field of Classification Search
None
See application file for complete search history.

(56) References Cited

U.S. PATENT DOCUMENTS

| | | | | |
|---|---|---|---|---|
| 5,819,676 | A * | 10/1998 | Cwalina | 114/21.3 |
| 6,462,697 | B1 * | 10/2002 | Klamer et al. | 342/36 |
| 7,026,980 | B1 * | 4/2006 | Mavroudakis et al. | 342/90 |
| 7,394,047 | B1 * | 7/2008 | Pedersen | 244/3.1 |
| 7,473,876 | B1 * | 1/2009 | Pedersen et al. | 244/3.1 |
| 7,511,252 | B1 * | 3/2009 | Pedersen et al. | 244/3.1 |
| 7,983,878 | B1 * | 7/2011 | Denis | 702/188 |
| 2005/0001759 | A1 * | 1/2005 | Khosla | 342/90 |
| 2008/0255911 | A1 * | 10/2008 | Khosla | 705/8 |
| 2009/0231183 | A1 * | 9/2009 | Nettleton et al. | 342/95 |
| 2010/0013696 | A1 * | 1/2010 | Schmitt et al. | 342/54 |
| 2010/0180344 | A1 | 7/2010 | Malyshev et al. | |
| 2011/0313957 | A1 * | 12/2011 | Ide et al. | 706/12 |
| 2012/0070034 | A1 * | 3/2012 | Xiao et al. | 382/103 |

OTHER PUBLICATIONS

Kovács, L. et al. "Shape-and-motion-fused multiple flying target recognition and tracking." Proc. SPIE 7696, Automatic Target Recognition XX; Acquisition, Tracking, Pointing, and Laser Systems Technologies XXIV; and Optical Pattern Recognition XXI, 769605 (May 12, 2010); doi:10.1117/12.850031.*
Llinas, J. et al. "Research in Evaluation Methods for Data Fusion-Capable Tactical Platforms and Distributed Multi-platform Systems in Electronic Warfare and Information-Warfare Related Missions." State Univ of New York at Buffalo Center for Multisource Information Fusion, 2009.*
Zhou, D. et al. "Spatio-temporal target identification method of high-range resolution radar." Pattern Recognition 33.1 (2000): 1-7. doi:10.1016/S0031-3203(98)00052-1.*

* cited by examiner

*Primary Examiner* — David Vincent
*Assistant Examiner* — Benjamin Buss
(74) *Attorney, Agent, or Firm* — Howard IP Law Group, PC (57) ABSTRACT

A method for classifying unclassified vehicle tracks using real-time sensor data comprises acquiring a computer database of vehicle track characteristics data for known vehicle tracks; defining vehicle track signatures based on the vehicle track characteristics data; and generating a graph based on the vehicle track signatures, the graph having state nodes representative of distinguishing vehicle track characteristics defined in the vehicle track signatures and links between the state nodes representative of relationships between distinguishing vehicle track characteristics defined in the vehicle track signatures, said graph also having reporting nodes for classifying unknown vehicle tracks when sufficient distinguishing vehicle track characteristics have been observed. The method also comprises processing with the graph, using a processor, real-time sensor data corresponding to a first unclassified vehicle track until the first unclassified vehicle track is classified.

19 Claims, 7 Drawing Sheets

METHOD AND SYSTEM FOR CLASSIFYING VEHICLE TRACKS

FIELD OF THE INVENTION

The present invention relates to vehicle classification, and more particularly to a method and system for classification of vehicle tracks using sensor data.

BACKGROUND OF THE INVENTION

A number of current electronic warfare support systems (ES) are used to classify vehicle tracks. One system monitors the electromagnetic radiation emitted by vehicles for the purpose of classifying the vehicles. Another system uses non-cooperative target recognition techniques (NCRT) such as jet engine modulation where a surveillance system directs energy at a vehicle and analyzes its reflected response for the purpose of classifying the target.

However, the current electronic warfare support systems have drawbacks. First, ES techniques require the vehicular track to be emitting previously classified patterns; common techniques for defeating ES analysis are to simply turn off any of the vehicle's transmitters, or to change to a new set of patterns held in reserve. NCTR techniques are also problematic including the aspect of the vehicle to the NCTR equipment. In addition, the current ES techniques do not fuse inputs from multiple sensor types, and do not associate events from different vehicles of different types to develop track classifications.

Thus, a rapid and accurate classification of vehicular tracks as a specific threat type is needed. Depth of fire and kill probability can both be improved with automated classification of potential threats, in particular of high-speed anti-ship cruise missiles, which pose a significant threat to naval combatants. These improvements can be obtained through more rapid classification and also through more reliable classification.

SUMMARY OF THE INVENTION

A rapid and accurate method for classifying vehicular tracks is disclosed. The method uses a graph that allows rapid classification of unclassified tracks. The graph may be developed using data from multiple sensor types and may associate events from different vehicles to develop classifications. Real-time processing may use data from multiple sensor types to allow a rapid classification.

A method for classifying unclassified vehicle tracks using real-time sensor data may comprise acquiring a computer database of vehicle track characteristics data for known vehicle tracks; defining vehicle track signatures based on the vehicle track characteristics data; and generating a graph based on the vehicle track signatures, the graph having state nodes representative of distinguishing vehicle track characteristics defined in the vehicle track signatures and links between the state nodes representative of relationships between distinguishing vehicle track characteristics defined in the vehicle track signatures, the graph also having reporting nodes for classifying unknown vehicle tracks when sufficient distinguishing vehicle track characteristics have been observed. The method may also comprise processing with the graph, using a processor, real-time sensor data corresponding to a first unclassified vehicle track until the first unclassified vehicle track is classified.

In an embodiment, the step of defining vehicle track signatures comprises: identifying in the computer database the distinguishing vehicle track characteristics for at least some of the known vehicle tracks; and prioritizing the distinguishing vehicle track characteristics for at least some of the known vehicle tracks, wherein the prioritizing comprises defining relationships between the distinguishing vehicle track characteristics. In the method for classifying vehicle tracks of claim 1, the vehicle track characteristics data may comprise at least one of speed, size, position, IFF status, heading, acceleration, airborne state, in motion state, operating altitude above or depth below sea level, likelihood of operating within a region of interest, acoustic response characteristics, electromagnetic emanation characteristics, kinematic maneuver characteristics, and electro-optic characteristics. In an embodiment, prioritizing the distinguishing vehicle track characteristics may further comprise prioritizing the distinguishing vehicle track characteristics and defining the reporting nodes according to a probability analysis. In an embodiment, defining relationships between the distinguishing vehicle track characteristics may comprise defining a relationship between the distinguishing vehicle track characteristics representative of the vehicle performing a known tactical maneuver. In another embodiment, defining relationships between the distinguishing vehicle track characteristics may comprise defining at least one relationship between a first vehicle track and a second vehicle track in which one of the vehicle tracks is for a vehicle capable of launching an attack weapon and the other of the vehicle tracks is for a launched attack weapon.

In an embodiment, the step of processing with the graph, using a processor, real-time sensor data comprises: receiving first initial real-time sensor data for an unclassified first vehicle track and passing the first initial real-time sensor data through an initial portion of the graph to determine a first current track state for the unclassified first vehicle track; determining whether one of the reporting nodes has been reached; and if one of the reporting nodes has been reached, classifying the unclassified first vehicle track; or if one of the reporting nodes has not been reached, receiving first updated real-time sensor data and passing the first updated real-time sensor data through an intermediate portion of the graph linked to a current track state to determine an updated first current track state, until one of the reporting nodes is reached and the unclassified first vehicle track is classified. In an embodiment, prioritizing the distinguishing vehicle track characteristics further comprises prioritizing the distinguishing vehicle track characteristics and defining the reporting nodes according to a probability analysis.

In an embodiment, the method for classifying vehicle tracks may further comprise: receiving second initial real-time sensor data for an unclassified second vehicle track and passing the second initial real-time sensor data through an initial portion of the graph to determine a second current track state for the unclassified second vehicle track; and receiving second updated real-time sensor data and passing the second updated real-time sensor data through an intermediate portion of the graph linked to the second current track state to determine an updated second current track state, until the unclassified second vehicle track is classified. In an embodiment, the method may further comprise determining if the unclassified first vehicle track and the unclassified second vehicle track are related by kinematic analysis of one or more of the initial first real-time sensor data, updated first real-time sensor data, initial second real-time sensor data, or updated second real-time sensor data. In an embodiment, the method may further comprise, if the unclassified first vehicle track and the unclassified second vehicle track are related, passing the updated first real-time sensor data in addition to the updated second real-time sensor data through the intermediate portion of the graph linked to the second current track state to determine an updated second current track state, until the unclassified second vehicle track is classified; and passing the updated second real-time sensor data in addition to the updated first real-time data to the intermediate portion of the graph linked to the first current track state to determine an updated first current track state, until the unclassified first vehicle track is classified.

In an embodiment, the method for classifying vehicle tracks may further comprise, if the unclassified first vehicle track and the unclassified second vehicle track are related, passing, if the unclassified first vehicle track has been classified, a first vehicle track classification in addition to the updated second real-time sensor data through the intermediate portion of the graph linked to the second current track state to determine an updated second current track state, until the unclassified second vehicle track is classified; and passing, if the unclassified second vehicle track has been classified, a second vehicle track classification in addition to the updated first real-time data to the intermediate portion of the graph linked to the first current track state to determine an updated first current track state, until the unclassified first vehicle track is classified.

A method for pre-processing vehicle track characteristics data to define a graph for classifying unclassified vehicle tracks may comprise acquiring a computer database of vehicle track characteristics data for known vehicle tracks; identifying distinguishing characteristics for at least some of the known vehicle tracks; prioritizing the distinguishing characteristics for at least some of the known vehicle tracks; and generating a graph having state nodes representative of the identified distinguishing characteristics and links between the state nodes representative of the prioritization of the identified distinguishing characteristics, the graph also having reporting nodes for classifying unknown vehicle tracks when a sufficient number of distinguishing characteristics have been observed.

In an embodiment, the vehicle track characteristics data comprise at least one of speed, size, position, IFF status, heading, acceleration, airborne state, in motion state, altitude above or depth below sea level, likelihood of operating within a region of interest, acoustic response characteristics, electromagnetic emanation characteristics, kinematic maneuver characteristics, and electro-optic characteristics. In an embodiment, prioritizing the identified distinguishing characteristics further comprises prioritizing the identified distinguishing characteristics and defining the reporting nodes according to a probability analysis. In an embodiment, defining relationships between identified distinguishing characteristics comprises defining a relationship between identified distinguishing characteristics representative of a vehicle performing a known tactical maneuver. In another embodiment, defining relationships between identified distinguishing characteristics comprises defining at least one relationship between a first vehicle track and a second vehicle track in which one of the vehicle tracks is for a vehicle capable of launching an attack weapon and the other of the vehicle tracks is for the launched attack weapon.

A computer system for classifying unclassified vehicle tracks may comprise: a database of defined vehicle track signatures for known vehicle tracks; a first processor executing instructions for generating a graph from the database of defined vehicle track signatures by defining state nodes corresponding to characteristics of the vehicle track signatures and defining links between defined state nodes, the links between the defined state nodes corresponding to defined vehicle track signatures; and a second processor executing instructions for performing run-time processing of real-time sensor data corresponding to a first unclassified vehicle track by passing the real-time sensor data through the graph until the first unclassified vehicle track is classified.

In an embodiment, the computer system may further comprise a third processor for executing instructions for defining vehicle track signatures for the known vehicle tracks using a probability analysis. In an embodiment, the second processor may further execute instructions for performing run-time processing of the real-time sensor data corresponding to at least a second unclassified vehicle track by passing the real-time sensor data through the graph until the second unclassified vehicle track is classified, wherein the run-time processing for the first unclassified vehicle track and the second unclassified vehicle track are performed at substantially the same time.

DETAILED DESCRIPTION

Figure 1:
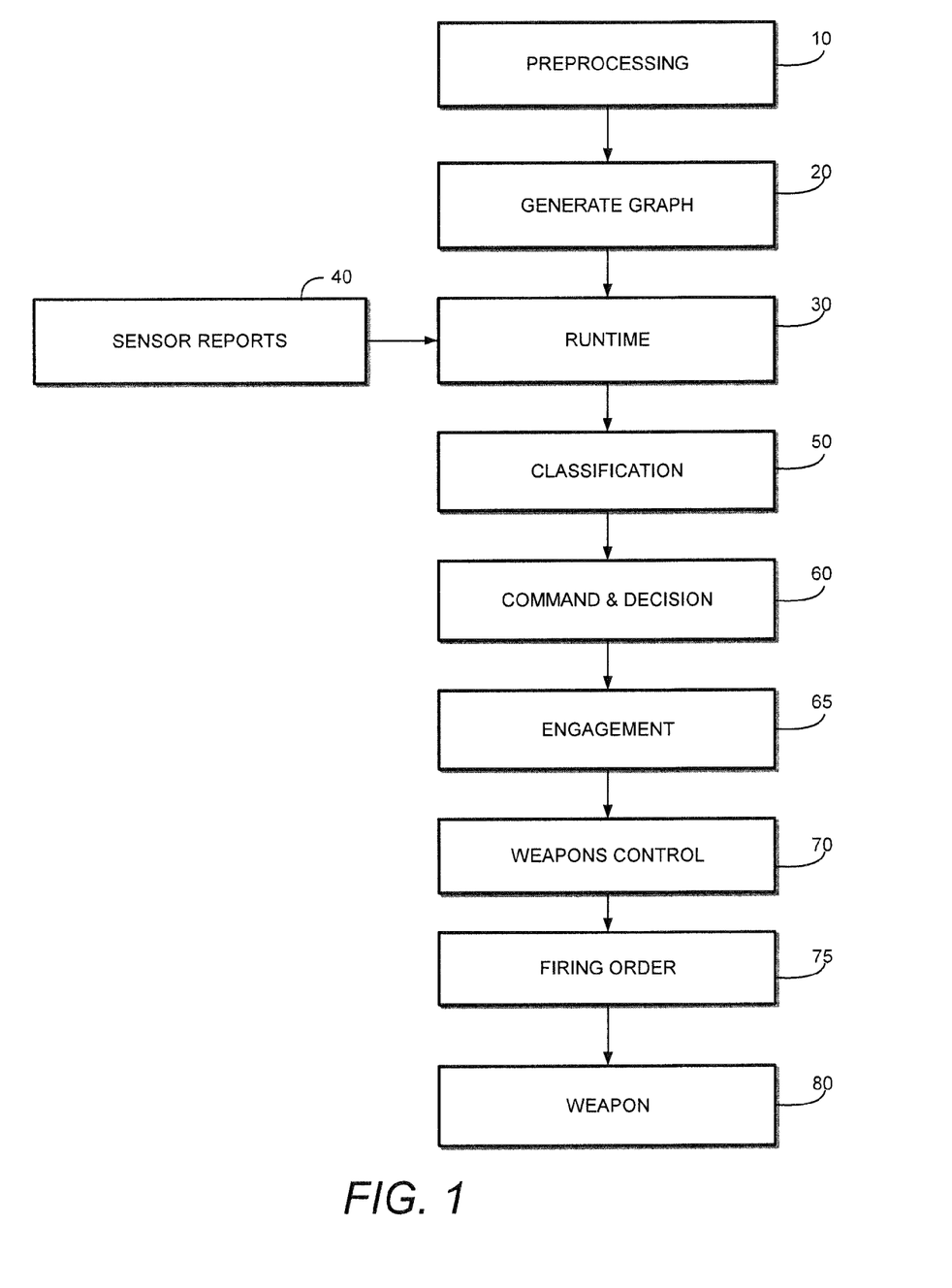
FIG. 1 depicts an overview of an embodiment of a process for vehicle track processing and weapons engagement.

FIG. 1 depicts an overview of an embodiment of a process for vehicle track processing. Step 10 is a preprocessing step in which data characteristics corresponding to known vehicle tracks are compiled by reviewing past sensor reports. Identifying and defining data characteristics that are unique to particular vehicles and which can be used to distinguish and identify a vehicle with a acceptable degree of certainty may be a lengthy, multi-faceted analysis, consisting of sifting through intelligence reports and data to identify characteristics that a) can be measured by the system's sensors, and b) used to uniquely distinguish an object's classification. Once characteristics are identified that can be measured by the system's sensors and that can be used to identify and uniquely distinguish a vehicle track's classification, the characteristics are used to create a graph at step 20. A graph is created in which known data characteristics for known vehicle tracks are graphed with nodes (states) and logical splices (links). In steps 30 and 40, real-time processing 30 is performed of real-time sensor data (which may be in reports) 40 using the graph generated in step 20. After a classification 50 is arrived at through the real-time processing 30, that classification information goes to a command and decision step 60. At the command and decision step, an engagement order 65 may be issued to a weapons control system 70. Then, the weapons control system 70 may issue a firing order 75 to a weapon 80.

Figure 2:
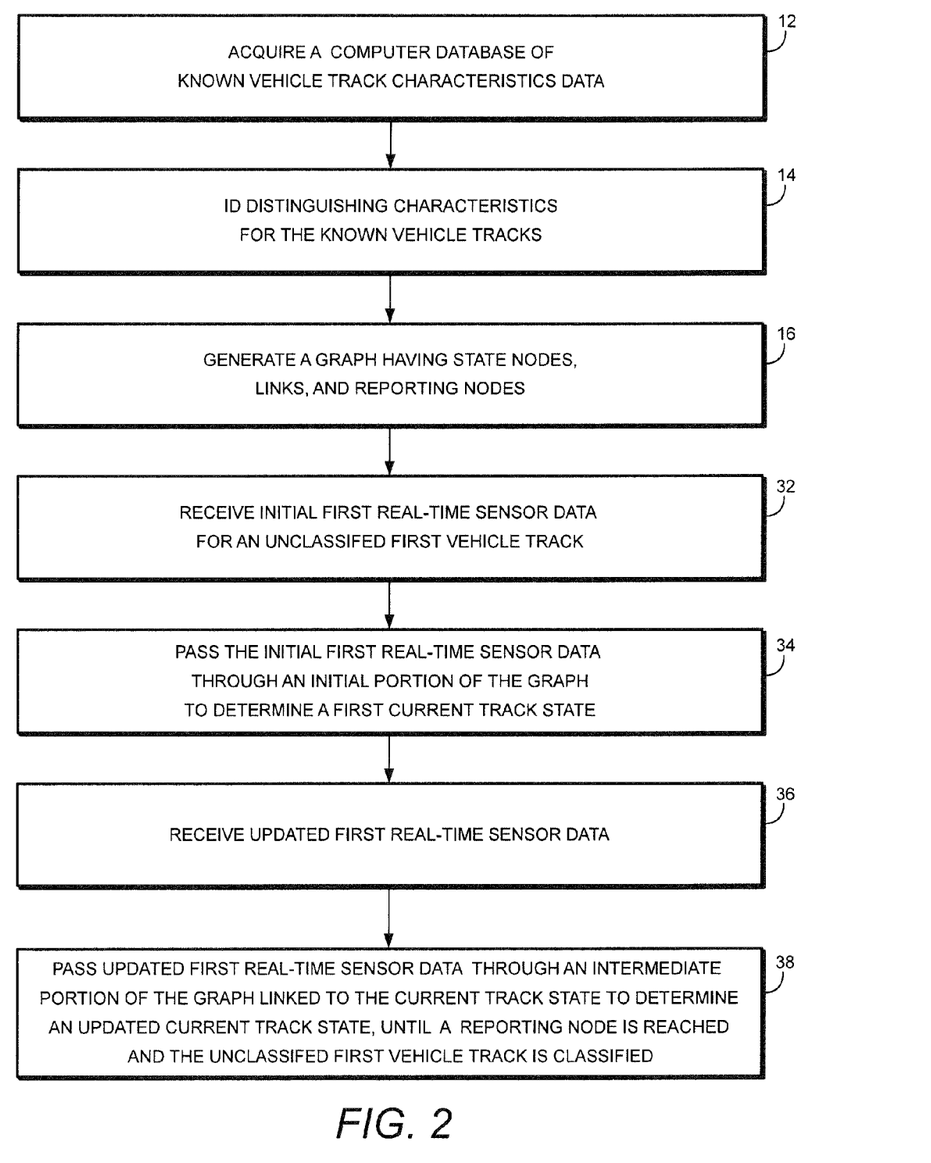
FIG. 2 depicts an overview of an embodiment of a process for vehicle track pre-processing and real-time processing.

FIG. 2 depicts an overview of an embodiment of a process for vehicle track pre-processing and real-time processing. In step 12, a computer database of vehicle track characteristics data for known vehicles is acquired, where the term "characteristics" may include the identity of the characteristic observed (e.g., size) and its associated value (e.g., small). Examples of characteristics include speed, size, position, IFF status, heading, acceleration, vertical acceleration, airborne state, in motion state, operating altitude above or depth below sea level, likelihood of operating within a region of interest, acoustic response characteristics, electromagnetic emanation characteristics, kinematic maneuver characteristics, and electro-optic characteristics. This database may typically have sensor data from previous engagements in which vehicles (which may be aircraft, missiles, ships, underwater threats, space threats, or any type of object or threat) have been tracked, and the sensor data associated with the tracking and the ultimate identification/classification of the vehicle. From this data, certain characteristics of various vehicles may be ascertained, such as, for example, the size of the vehicle, the maximum speed of each vehicle, and the acceleration characteristics of each vehicle. Alternatively, a computer database may be based on known characteristics of various vehicles gathered from intelligence reports or other types of reports that are not necessarily based on previous tracking data, for example a reference book that discloses characteristics of various vehicles such as their size and speed. After the database is acquired in step 12, the database is reviewed for distinguishing characteristics that may be used to classify the vehicles. For example, if the vehicle is a certain size, it may be known that the vehicle is an aircraft rather than a missile. In another example, the distinguishing characteristic is even more specific, such that the observation of the characteristic, alone or in combination with other sensed data, definitively identifies the vehicle to an acceptable threshold of confidence. For example, if a vehicle's size indicates that it is a missile rather than an aircraft, and it's trajectory is one that is unique to only a particular type of missile, those two characteristics may be used to classify the vehicle track as a specific type of missile.

After the various characteristics are identified for different vehicles, a graph may then be generated having state nodes that represent different characteristics that may be sensed and links between nodes that represent logical connections between different sensed characteristics. In an embodiment, the graph may have initial state nodes, intermediate state nodes, and reporting state nodes. In an example, an initial state mode may represent a particular sensed size characteristic for a vehicle track, such as a sensed size corresponding to a missile. The next level of intermediate state nodes that are linked to the initial state node will correspond to data for various type of missiles; it would be illogical to link an initial state node corresponding to a missile characteristic to intermediate state nodes that represent data corresponding to aircrafts. State nodes and logical links are constructed to ultimately result in a vehicle classification in a reporting node. The reporting node represents the observation of one or more vehicle characteristics that, alone or in combination with other previously observed characteristics, enables classification of the vehicle track to a desired level of confidence. Steps 12, 14, and 16 correspond to the preprocessing step 10 of FIG. 1.

After the preprocessing represented by steps 12, 14, and 16, real time processing of sensor data may be performed. The real time processing typically involves traversing the graph that was developed in the pre-processing stage. In an embodiment, initial first real-time sensor data for the unclassified first vehicle track is received 32 and passed to an initial portion of the graph to determine a first current track state for the unclassified first vehicle track 34. Then updated first real-time sensor data is received 36 and passed through an intermediate portion of the graph linked to the current track state to determine an updated current track state as shown in step 38. The processing may remain at the initial intermediate node or progress to other linked intermediate nodes upon receipt of updated sensor data, until updated sensor data is received that causes a traversal of the graph to a reporting node. A reporting node is a node that, if reached, indicates that the cumulative sensor data received for a vehicle track has allowed for traversal of the graph such that classification of the vehicle to an acceptable level of confidence has been achieved. As will be understood, in the creation of the graph, different or varying acceptable levels of confidence (i.e., for reach a reporting node) may be incorporated for different vehicles. For example, when considering characteristics that are representative of a missile, it might be desirable to configure the graph to require a lower level of certainty so that the vehicle can be classified as a missile early and appropriate defensive actions may be taken as soon as possible. By way of further example, when considering characteristics that may be used to classify a vehicle as a military aircraft rather than a commercial airliner, it may be desirable to require a very high level of confidence to make a classification, to prevent an accidental encounter with a commercial airliner. In an embodiment, the graph may alternatively be created to always require a very high level of confidence before classifications are made, which may have the effect of requiring black and white, deterministic, characteristics to be observed (e.g., the vehicle is a specific size, moving at a specific speed, and flying on a specific path) before classifying a vehicle.

Figure 3:
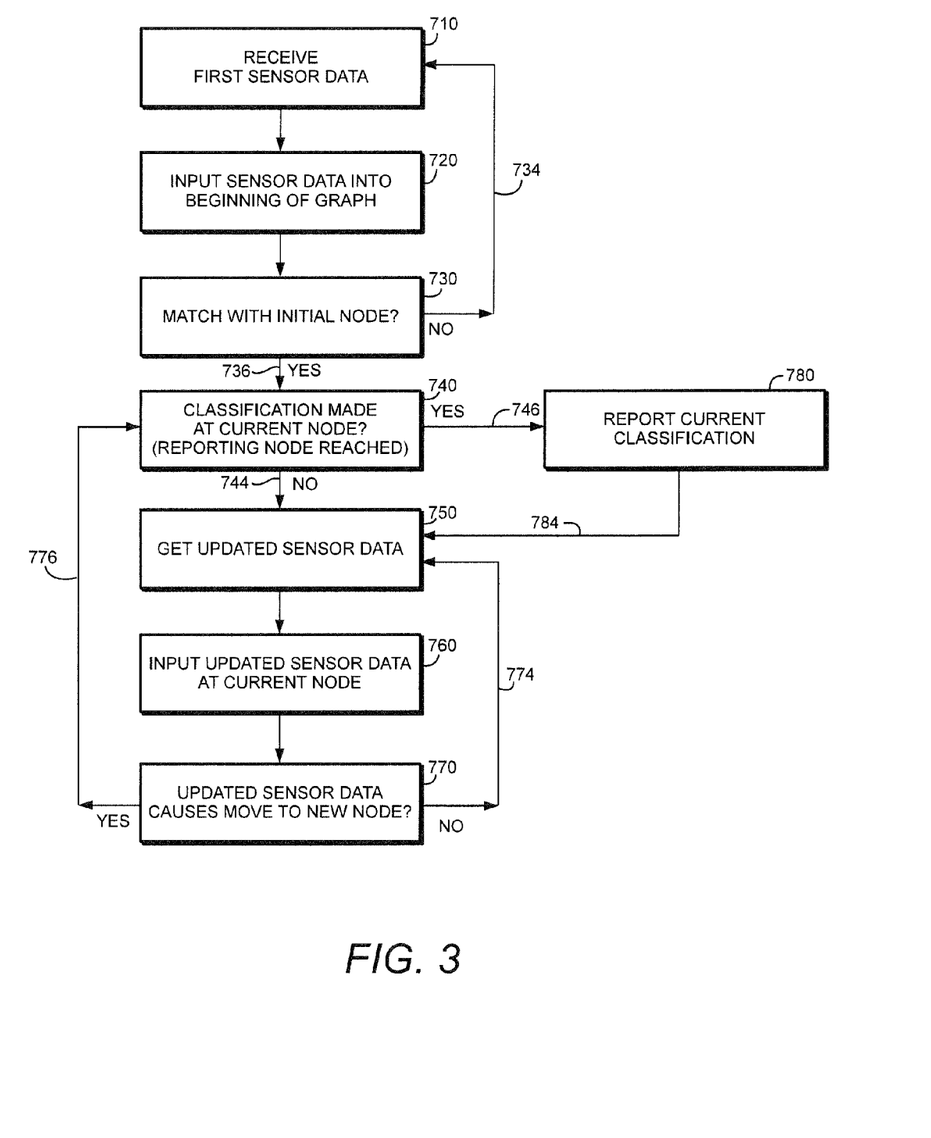
FIG. 3 is a simplified logic flow chart or diagram illustrating the runtime processing for vehicle track classification.

FIG. 3 is a logic flow chart or diagram illustrating the runtime processing for performing a rapid comparison between the characteristics of sensor data and the known characteristic patterns of vehicle tracks in the first characteristic table and the completed signature graph. In FIG. 3, the logic starts at a block 710 in which the first real-time sensor data is received. As will be understood, the sensor data may be received in a report that may contain sensor data from a variety of sensors, and which may contain data for various characteristics sensed by the various sensors. Examples of different types of sensors include, but are not limited to, radar, sonar, IFF (Interrogate Friend or Foe), ES (electronic support), and electro-optical. From block 710 the logic flows to a block 720, which represents inputting the sensor report data into the beginning of the graph. After the sensor report sensor data has been input, in decision block 730 a determination is made as to whether input of the data has resulted in traversal of the graph to an initial node. That is, an assessment is made as to whether the sensor data contains one or more characteristics (e.g., speed) and values (e.g., 250 mph) that matched the characteristics and values of an initial node of the graph. If it is determined that a match with an initial node did not occur, whether because none of the sensor data matched a known vehicle track represented in the graph or perhaps because the sensor data was faulty, the logic flows via logic path 734 back to the beginning to get a new sensor report.

If it is determined that a match with an initial node was made (i.e., one or more observed characteristics from the sensor report matched the one or more characteristics that defined an initial node), the logic flows via logic path 736 to block 740, in which a determination is made as to whether a classification of the vehicle has been made. As will be understood, sensor data that includes a match to one or more characteristics and values of an initial node may also contain additional data that permits further traversal of the graph to intermediate nodes or even to a reporting node. That is, if the sensor data in the initial sensor report included enough matching characteristic data to the graph such that traversal of the graph from a beginning first characteristic node to an end, reporting portion, of the graph was made, then a classification was made. If the sensor data only caused a partial traversal of the graph to a first characteristic node or an intermediate node, but did not reach the reporting portion of the graph, then a classification was not made. If the sensor data included data that caused a traversal to a reporting node and a classification was made, the logic flows via logic path 746 to block 780, where the vehicle track identification is reported.

Once a report is made, the logic then flows from block 780 to block 750 via logic path 784, where subsequent measurements in the updated sensor report are analyzed to determine when and if the reported classification should be updated, based on additional information about the track as revealed in these subsequent measurements. As will be understood, a vehicle may pose as a different type of vehicle to disguise its true nature; for example a fighter plane may intentionally engage in behavior to show characteristics that identify it as a commercial airliner so that it is not perceived as a threat. By continually reviewing additional updated sensor data even for already classified vehicle tracks, "imposters" or incorrectly classified vehicle tracks may be updated or changed to a correct classification if necessary. Appropriate nodes and links are connected to the reporting nodes to allow consideration of later sensor reports and reclassification if needed. For example, in an embodiment, some or all of the reporting nodes may be linked to nodes that are defined with characteristics that are related to a different type of vehicle than reported. Then if reporting data that is inconsistent with the reported vehicle is received, a move is made to the node representing inconsistent characteristics and if enough inconsistent characteristics are observed a new reporting node may be reached and a new classification made. If no inconsistent characteristics are observed, then no moves are made and the classification does not change. The continuous analysis of new reporting data even for already classified vehicle tracks helps ensure the accuracy of each classification.

If a classification was not made in block 740, the logic flows via logic path 744 to block 750. In block 750, updated sensor data, which may be in the form of a sensor report, is received. The updated sensor report will contain new sensor data, which may include data from more than one sensor. At block 760, the new sensor data is input into the graph at the last determined state or node, which may be an initial node or an intermediate node. By starting at the last determined state or node, the new sensor data is used to build upon the data that was already graphed, and the graph may be designed to build upon sensor data in a specific way. In a hypothetical case, the current state node is "Q," which was arrived at because the sensor data included data indicating that the vehicle was a certain size indicative of an aircraft. The graph can be designed so that being in state "Q" causes sensor updates to be analyzed for groundspeed of the vehicle (e.g., whether the vehicle is one of three categories such as slow, medium, or fast), the groundspeed being a characteristic that can further help classify the vehicle. This is accomplished by linking state node Q to further state nodes that represent groundspeed characteristics slow, medium, and fast, and perhaps building into state node Q information (or a command) that it should look for speed data in the next sensor report. As a result, inputting the new velocity information starting from the last current state node "Q" of the graph allows the processing to build upon the previously known information.

After the updated sensor report sensor data has been input to the current node, in decision block 770 a determination is made as to whether inputting the data has resulted in traversal of the graph to a new node. That is, did the sensor report data contain characteristics and associated values that matched any of the characteristics and values of later state nodes that were linked to the current state node, such that the graph was traversed from the current state node to a new current state node. If it is determined that traversal to a new node did not occur, the logic flows via logic path 774 back to block 750 to obtain new sensor data, until traversal to a new node occurs.

If it is determined that traversal to a new current state node did occur, the logic flows via logic path 776 to block 740, where an assessment is made as to whether a classification of the vehicle has been made. Typically, the reporting node will be self-identifying (e.g., it will include instructions for reporting that a classification has been made on the computer housing the graph or a computer networked to the graph computer) and a classification is made if a reporting node is reached. As will be understood, the reporting node is linked to intermediate nodes and initial nodes, thus reaching the reporting node is the result of traversing the graph because certain characteristics and values represented by the initial and intermediate nodes have been observed in the sensor data, and the observation of that cumulative data gives a level of confidence that a correct classification is possible. If a classification was made, the logic flows via logic path 746 to block 780, where the vehicle track identification is reported. If a reporting node is not reached—i.e., the current state node is an intermediate state node but not a reporting node—then a classification was not made in block 740, and the logic flows via logic path 744 to block 750 and an updated sensor report is received.

A graph designed for the inputting of sensor data may have initial nodes, intermediate nodes, and reporting nodes. Each node represents one or more characteristics and associated values that are observable by a sensor. By way of example, the position, velocity and acceleration of a vehicle's tracks are kinematic characteristics that can be measured by a sensor and which can uniquely distinguish a vehicle track. In an embodiment, the characteristic of position can include values such as above or below the water and inside or outside of the atmosphere. Speed may have different possible values such as slow, average, and fast, or in another embodiment actual speed ranges may be used to define the characteristic of speed. The characteristic of acceleration can also have values such as slow, average, and fast, and as will be understood by those skilled in the art, different aircraft can have different takeoff acceleration characteristics (e.g. commercial airliners in general are known to have very distinctive takeoff acceleration characteristics, and different models of commercial airliners may have takeoff characteristics that are distinguishable from other models). Size is an example of a static characteristic that may be observed by a sensor and embodied in a node.

Dynamic characteristics may also be embodied in state nodes. For example, a state node can be defined that embodies a certain value of vertical acceleration that may be associated with a particular type of maneuver. Alternatively, a relationship between a series of state nodes may be defined to embody vehicle position changes over time that represent a particular type of maneuver or behavior, and the linking of the nodes may represent the vehicle performing the particular maneuver or behavior over a number of sensor reports. For example, persons with ordinary skill in the art understand that commercial airlines fly along well-known and identifiable GPS vectors or routes, so a series of state nodes may be defined that embody flight along a known route, and consistent behavior of flight along a known commercial route could be used to distinguish commercial aircraft from military aircraft. By way of further example, persons with ordinary skill in the art understand that high vertical acceleration "pop-up" maneuvers may be performed by a vehicle, so a relationship between a series of state nodes may be defined that embody characteristics that represent such a maneuver being performed. Observation of a pop-up maneuver may be indicative of the vehicle being a military aircraft rather than a commercial aircraft.

In an embodiment, reporting nodes are not only defined to identify vehicle tracks by the specific identify of the model of vehicle embodied by the tracks, reporting nodes may also be defined that allow classification based on less specific classes, such as whether the vehicle is military or commercial. Thus, for example, if a pop-up maneuver is observed being performed by a vehicle track, it may be desirable to define the graph so that it immediately reports that the track is related to a military vehicle so that avoidance maneuvers and defensive actions may be taken, instead of waiting to classify the vehicle track only when the specific model of vehicle has been identified. Similarly, if a vehicle track shows movement along a known commercial airline route, it may be desirable to define the graph so that it immediately reports that the vehicle associated with the track is commercial so that offensive maneuvers against the vehicle are not taken even though the exact model of commercial vehicle has not been identified, thus preventing an accidental incident with the commercial vehicle. As will be understood, in an embodiment (not shown), the graph may be defined to continue even after a general classification such as military versus commercial is made in a reporting node, so that continued identification of the vehicle can be performed to more accurately identify the vehicle. For example, while it may be beneficial to define the graph so that it reports (reaches a reporting node) once it determines that a vehicle track is associated with a military vehicle, it may also be helpful to further identify a specific type of military vehicle so that the exact nature of the threat is known. Links and nodes that extend from the "less specific" reporting nodes may be defined that then allow for more detailed identification of the vehicle track, based on future sensor reports.

Logical links are used to link nodes. The nodes are linked as desired by a user to achieve certain relationships between nodes. In an embodiment, the characteristics and values that are used to classify a vehicle track from an initial node, through an intermediate node, and then to a reporting node, and the order in which those characteristics and values are linked, may represent a "signature" for the vehicle track. How those signatures are defined by a user may play an important role in the effectiveness of the graph during real-time processing. In defining the vehicle track signatures, the user selects the characteristics that are desired to be identified and compared, and the order in which the characteristics are to be considered, and the values of the characteristics that are to be considered. These selections allow the user to prioritize the characteristics (e.g., look at size data first, then speed, then acceleration) and to choose a level of granularity for the values assigned to the characteristics—for example, for one signature it may be sufficient to characterize speeds in terms of slow, medium and fast, while in another signature a higher level of granularity may be desired so 5 different speed ranges (e.g. 200-300 mph, 301-400 mph, etc.) may be defined for the signature. The signatures may be defined by reviewing tracking reports from a variety of different types of sensors or other intelligence data relating to vehicle tracks, and studying the characteristics that are unique to particular vehicles. In identifying unique signatures the goal is to identify distinguishing behavior (as reflected by measurable characteristics and values for those characteristics) that, if observed in a vehicle track exhibiting the characteristics, allows a sufficiently unambiguous classification, to a degree of desired confidence, for that track.

As will be understood, choosing how the characteristics are prioritized effectively defines relationships between different characteristics and determines how the characteristics and values (represented by nodes in the graph) are linked within the graph. Thus, prioritization may allow a user to effectively instruct each node on what type of characteristics it should look for next in order to proceed to a further node. As noted in an earlier example herein, if a current state node is only linked to later nodes that are defined by the characteristic of groundspeed, the current state node is essentially instructing the graph to next look for groundspeed data. Thus, current state nodes may essentially "instruct" the system how to analyze (i.e., what to look for) updated sensor data it may receive. Thus, the analysis and progression through the graph is state dependent. As will also be understood, various types of statistical and mathematical analyses may be used in prioritizing and linking state nodes, and when selecting characteristics and values that are used to help classify the vehicle tracks. In particular, Bayesian probability analysis may be used as well as others. As will be understood, these analyses may help a user define the graph so that relationships are formed between characteristics and values and different characteristics and values are linked together to build upon each other and result in a vehicle track classification to an acceptable degree of confidence.

In an exemplary embodiment, a graph may be constructed for classifying a vehicle track using probabilistic inference that, to a pre-defined level of confidence, the vehicle is a member of a class of commercial airliners. The graph may be constructed with nodes that correspond to known characteristics of commercial liners such as (but not limited to): that commercial airliners typically fly in pre-designated air corridors at pre-designated times; that commercial airliners typically respond to SSR (Secondary Surveillance Radar) interrogations from air traffic control systems using pre-designated response codes; and that commercial airliners typically fly in a manner that contributes to passenger comfort by minimizing maneuvering accelerations. The graph may be constructed and then used to assess the probability that a vehicle is a commercial airliner by analyzing these characteristics over time. Accordingly, specific nodes may be defined corresponding to known behaviors of commercial aircraft, for example with nodes possibly being linked that reflect if the vehicle has been observed travelling in a known commercial air corridor for some specified period of time, nodes being linked that reflect the vehicle being in a known commercial corridor at a time that is consistent with a pre-scheduled commercial flight, nodes being linked that reflect a vehicle responding to SSR interrogations with an expected response code for a commercial airliner, and nodes being linked that reflect acceleration characteristics of the vehicle that are consistent with the expected range of accelerations for a commercial airliner. As will be understood, each node may correspond to more than one characteristic, e.g., a node may be defined that includes characteristics corresponding to an expected SSR interrogation response for a commercial airliner and also characteristics corresponding to an expected acceleration characteristic of a commercial airliner. After the graph is constructed it can be used to compare observations of a particular vehicle over time with a model of behavior embodied in the graph during pre-processing that is consistent with the expected behavior of a commercial airliner.

As will be understood, full agreement between the expected and observed behavior may not always be achieved.

A vehicle may exhibit some but not all of the expected behavior, or it may exhibit aspects of behavior that are at times inconsistent with the expected behavior. However, when the observed behavior is sufficiently consistent with the expected behavior, a level of confidence may be reached that the vehicle is a particular type of vehicle (e.g., a commercial airliner), and the graph can be defined to take into account this acceptable level of confidence. The point or points (i.e., nodes) in the graph at which the observed vehicle reaches this level of confidence may be determined during the pre-processing phase of constructing the graph by methods known to those familiar with the art, such as the method of Bayesian analysis. In this approach, the consistencies of observed and expected behaviors are weighted and analyzed for all possible conditions to assess the probabilistic certainty of the classification result. Once the desired classification confidence threshold is reached for a given thread of behaviors represented in the graph, a classification decision node can be added to the graph. At runtime, when any such classification decision node is reached as the graph is traversed using sensor data for a particular vehicle, the vehicle can then be classified (e.g., as a commercial airliner) with this decision having been made to the desired level of confidence that the object has been classified correctly. A similar approach can be used to develop and employ the graph for classifying any type of vehicle.

In an embodiment, the graph may be created by using substantially the process described in U.S. patent application Ser. No. 12/917,550, which is fully incorporated herein by reference. In accordance with the application, once the unique signatures for a number of different vehicle tracks have been defined, they may be placed in a list or table. The list or table may then be used to create the graph according to the process described in the application. Because the signatures for vehicle tracks are less deterministic than the signatures for malware described in the application, each characteristic may have a variable range of values and the "preamble" described in the application is not applicable. Otherwise, the process is similar and can be applied without undue experimentation, with nodes being created for different characteristics and their associated values, and with logic links connecting the nodes in accordance with the signatures that were defined from the previous tracking data or intelligence information. In an embodiment, the list or table may be prioritized so that the characteristics are considered in the same order for each signature. However, in other embodiments the list or table need not be prioritized and the prioritization performed in creating the individual signatures is untouched.

It will be understood that while the method to create a graph described in U.S. patent application Ser. No. 12/917, 550 may be used, other methods may also be effective. For example, a brute force method of creating a graph may be used where nodes and links are defined by hand, and then embodied in a computer graph to which real-time sensor data may be input. Because creation of the graph is, in an embodiment, performed in a pre-processing step before real-time implementation of the graph, the pre-processing may be performed "off-line" and a massive amount of human and computing power may be dedicated to the task.

Figure 4:
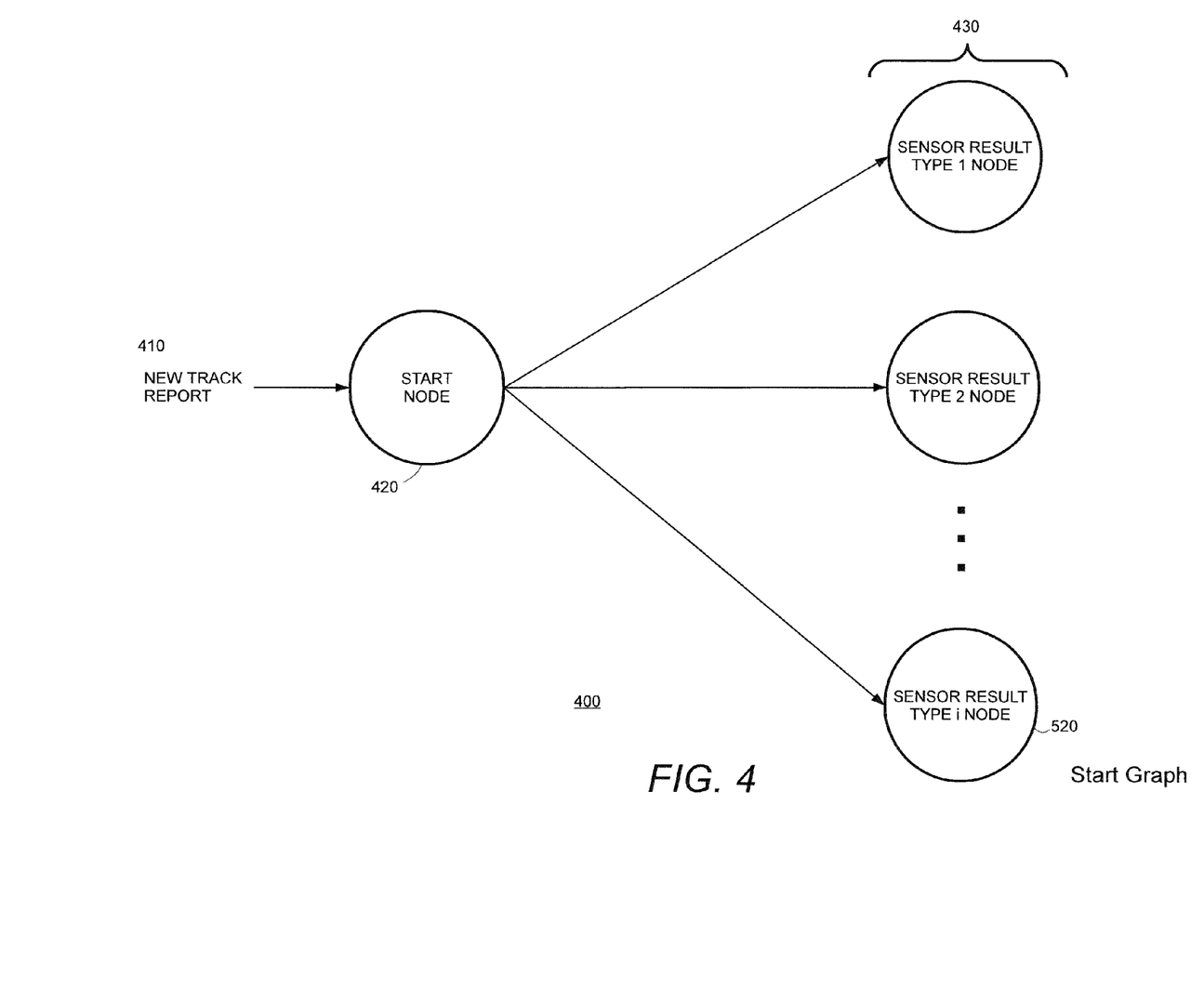
FIG. 4 depicts an initial or starting portion 400 of a classification graph of an embodiment of the invention.

FIG. 4 depicts an initial or starting portion 400 of a graph of an embodiment of the invention. The start node 420 receives sensor data, which may be in the form of a sensor or track report 410. The new track report may include data from a single sensor or it may include data from a variety of different sensors such as (but not limited to) radar, sonar, or IFF (Interrogate Friend or Foe). The nodes in the graph correspond to one or more vehicle track characteristics and values that may be measured or observed by one or more sensors, and nodes 430 are initial nodes that are connected to the start node. Thus, the type 1 node may correspond to data for a first vehicle type and the type 2 node may correspond to data for a second vehicle type and so on, and the starting portion may contain "i" types of nodes. The initial nodes may be defined as desired by a user, for example a graph could be created in which type 1 node may correspond to data for several vehicle types (e.g., aircraft of a similar size) and the type 2 node may correspond to data for several vehicle types different than the type 1 vehicle types (e.g., missiles of a similar size). As will be understood, the characteristics and associated values represented by the different start nodes are defined during the creation of the graph as discussed herein. The data in the sensor report is input into the start node, and if the data matches the data within one of the starting section "initial" nodes 430, the graph is traversed to the node 430 and a state "n" is established for the tracking data in the tracking report, where n is a number from 1 through i.

Importantly, the initial or starting portion of the graph may, in an embodiment, actually be a node in the "interior" of the graph. That is, when a graph is created, some characteristics and their associated values may be at a beginning part of the graph (these characteristics are configured, in the context of the signatures, to be considered earlier than other characteristics), some will be in a middle portion of the graph (some characteristics are considered earlier and some later), and some will be at an end part of the graph. In an embodiment, however, the starting position at which processing of an initial set of sensor data begins may not be at the "beginning" of the entire graph. For example, in an embodiment a signature may be created with nodes and links representative of the characteristics of a commercial 747 airliner in different phases. The signature characteristics as defined in the graph may start with take-off characteristics, then link to cruising characteristics, and then link to landing characteristics. If initial sensor data, such as data in a sensor report, includes data with characteristics matching characteristics of the commercial 747 airliner in its cruising phase, entry into the graph may be made in an interior section of the graph. For purposes of real-time processing, the node at which the graph is entered with initial data is considered the starting or initial portion of the graph for that particular set of initial data.

Figure 5:
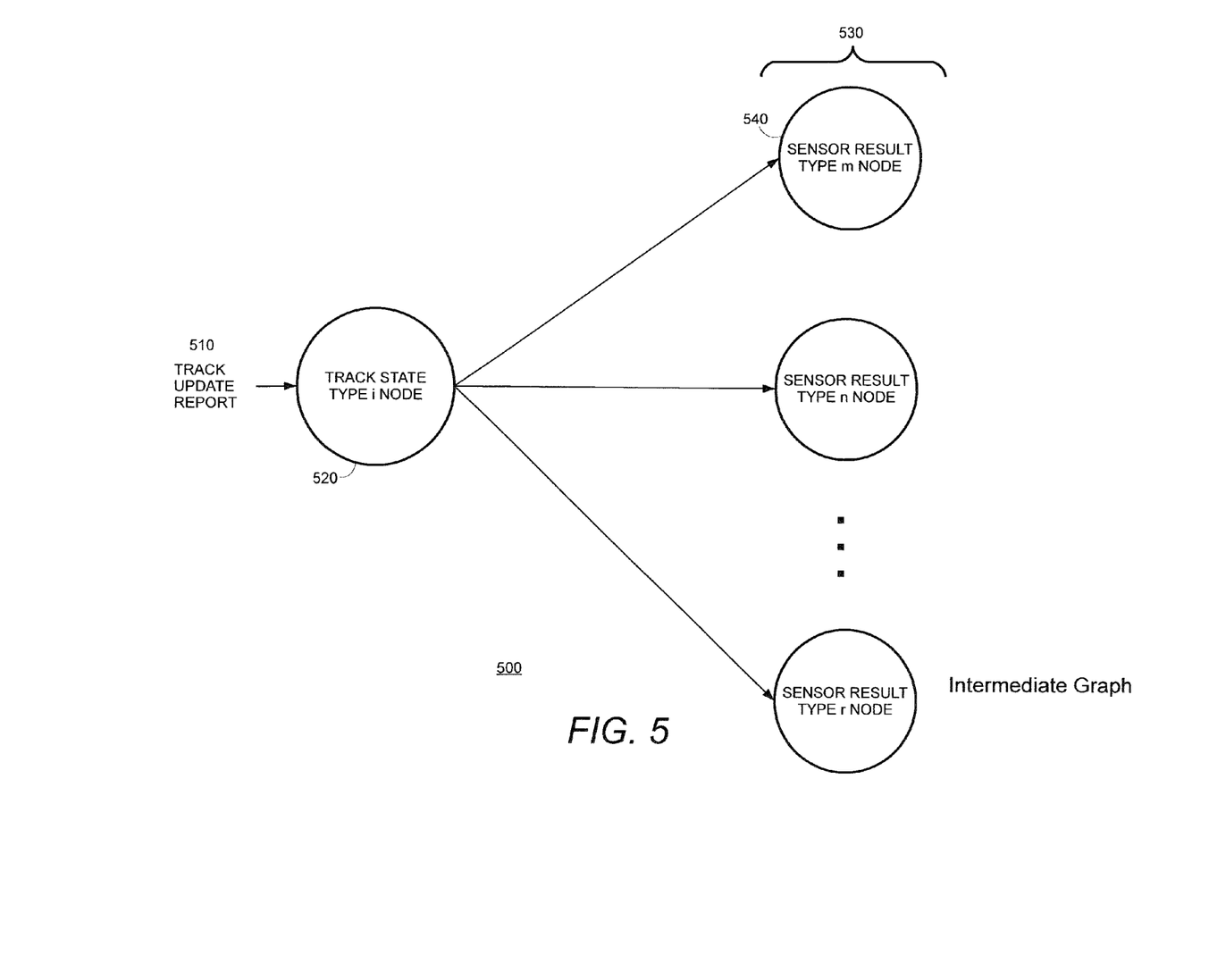
FIG. 5 depicts an intermediate portion 500 of a classification graph of an embodiment of the invention.

FIG. 5 depicts a section of an intermediate portion 500 of a signature graph of an embodiment of the invention. As will be understood, each of the initial nodes 430 of FIG. 4 will have links to an intermediate portion; for clarity FIG. 5 only depicts the intermediate portion adjacent to node 520. The intermediate portion begins from the last known track state of the vehicle being tracked, shown as node 520 in this example, as established in either the initial portion 400 of the graph or in a previous iteration of the intermediate portion 500 of the graph. Updated sensor data, which may be in a sensor or track report 510, is received, and as with the initial report, the updated report may contain data from a single sensor or a variety of sensors. The data is input into the current node to determine if it includes additional data that would cause a traversal from the current node to one of the later intermediate nodes 530. If the new data in the sensor report does not include data that would cause a traversal, the current node remains the same. In an example, new data is received that causes a traversal of the graph from node 520 to node 540 denoted "Track States Type m Node." If this traversal does not result in a complete classification of the vehicle track, node 540 becomes the "current" node (in essence becoming node 520 for a next iteration of new sensor data) from which any additional traversal is made. The intermediate portion 500 of the graph is repeated until an updated track report is received that includes data that would cause a traversal to a reporting node in the reporting stage of the graph.

Figure 6:
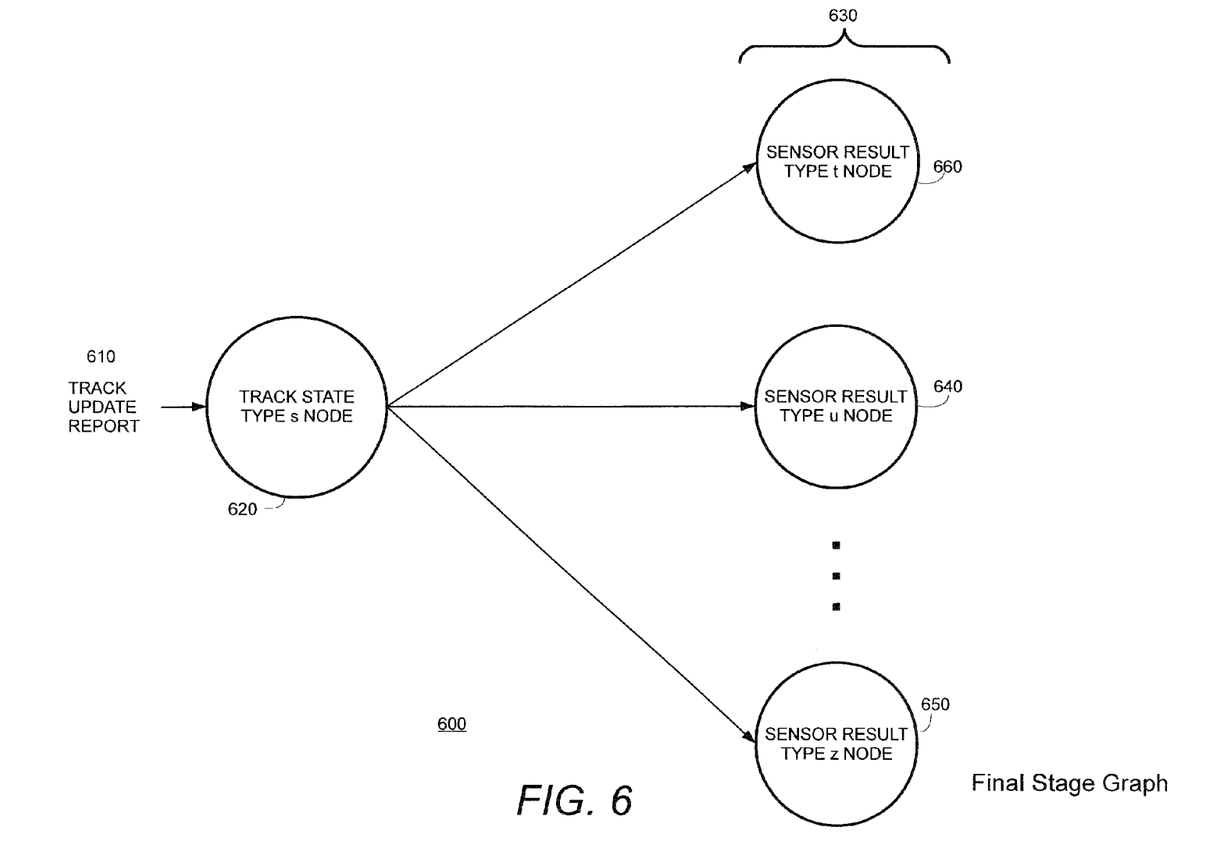
FIG. 6 depicts a reporting stage portion 600 of an exemplary classification graph.

FIG. 6 depicts an example of portion 600 of the graph that has a reporting node 640 among non-reporting nodes, and which may be deemed a reporting stage, at least in relation to the reporting node. In an embodiment, the reporting stage portion is reached when a report is input into the current node and the report contains data that causes a traversal to a "reporting node" for which a classification is associated. In FIG. 6, updated data in the form of a sensor or track report 610 is input into the current node 620. As will be understood, current node 620 is a node in the intermediate section of the graph that was previously traversed to based on previously received sensor data. In the example shown in FIG. 6, node 640 is a node for which a track classification is associated while nodes 650 and 660 are nodes for which a classification is not associated. As will be understood, in an example where the updated sensor data causes a traversal to non-reporting nodes 650 and 660, those nodes act as nodes in the intermediate section 500 and updated sensor data and/or reports is needed to traverse from those nodes. Non-reporting nodes will typically represent a match between the updated data and one or more characteristics for a known vehicle track, in which the match is relevant but does not sufficiently distinguish the track to a desired level of confidence. In another example, the updated track report includes data that matches one or more characteristics associated with node 640, which causes a traversal to node 640, which reports a classification for the track. That classification is the result of cumulative traversals from the initial portion of the graph and through the intermediate portion of the graph, in which the traversals correspond to a known signature that is reflected in the nodes and logic links between nodes on the graph. The reporting nodes thus reflect a node at which the cumulative observed data reaches a desired level of confidence that a correct classification can be made. As noted, even after a reporting node is reached and a classification made, additional sensor reports may be monitored to ensure that the classification is correct. In the example of FIG. 6, additional links (not shown) may extend from node 640 to nodes in the graph that represent characteristics that are inconsistent with the classification made in node 640. Observation of one or more inconsistent characteristics may lead to traversal to one of the nodes linked to the reporting node, which may eventually lead to a reclassification of a vehicle track if enough inconsistent characteristics are observed to achieve a level of confidence that a reclassification is warranted.

In an example, node 620 is a node that is reached because the data represented by the nodes that were traversed to reach node 620 suggest that the vehicle being tracked is a particular type of aircraft. However, a final determination has not been made because the data has not reached a desired level of confidence. In this example, nodes 650 and 660 may represent other characteristics and values that are consistent with the aircraft, but which still do not reach a desired level of confidence. For example, node 650 may represent characteristic data that indicates that the vehicle is flying at a certain speed that is consistent with the aircraft and node 660 may represent characteristic data that indicates the vehicle is size that is consistent with the aircraft. However, the cumulative data leading up to nodes 650 and 660 is not enough to make a clear classification because the data represented by the preceding nodes and links is consistent with several different types of aircraft. In contrast, in the example node 640 may represent characteristic data that indicates the vehicle has achieved a certain vertical acceleration value, which value is known to be associated only with a single type of aircraft. At this point classification has reached a desired level of confidence (which the user has effectively defined in the graph during the creation of the graph) and node 640 is configured to be a reporting node.

In an embodiment, sensor data (FIG. 7, block 810) may contain data relating to more than one vehicle track (block 820), for example if the sensors monitoring an area observe multiple aircraft or ships, or observe an aircraft and a missile or a ship and a missile within the monitoring area. In this situation, separate pre-processing (unrelated to the pre-processing for creating the graph) may be done to the data before it is input into the graph to determine whether (block 830) the tracks are related (e.g., an aircraft and a missile fired by the aircraft or a ship and a missile fired by the ship) or unrelated (e.g., separate vehicles such as aircraft or ships that happen to be within a monitored area). For example, kinematic analysis may be performed to determine whether the tracks are related, and that analysis may use initial and updated real-time sensor data from each of the tracks that are being assessed for relatedness. If the sensor data does not contain data for more than one track, the data is processed as a single track (block 825).

Figure 7:
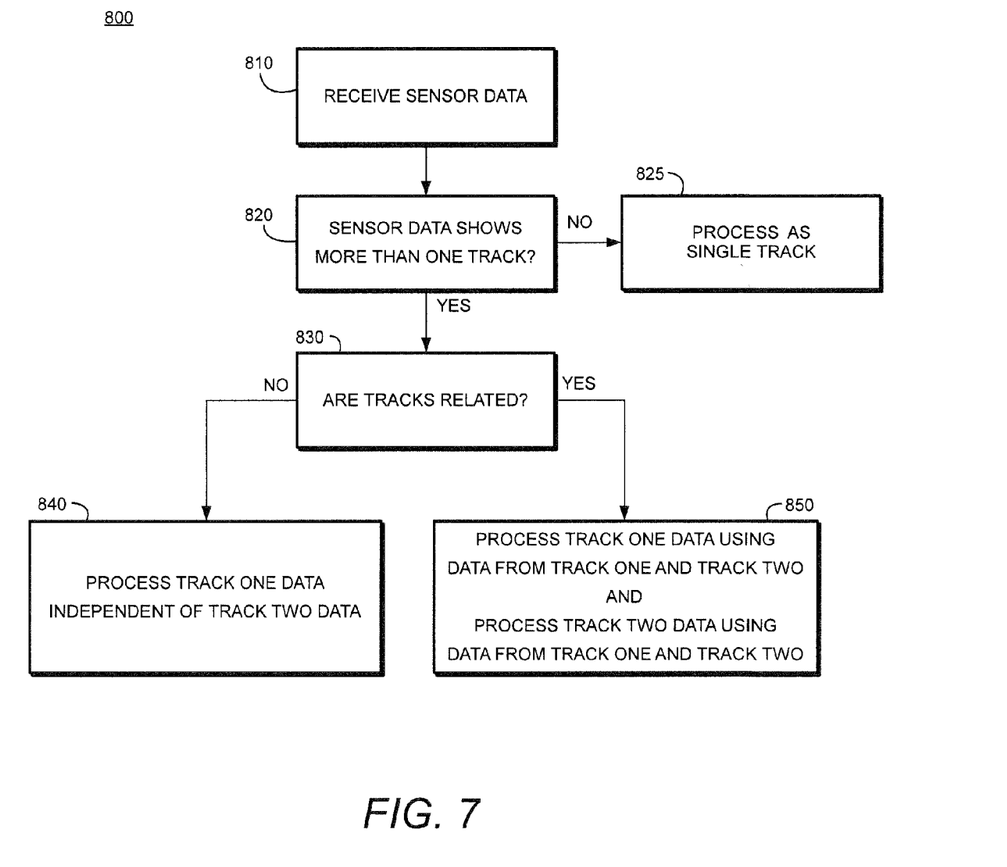
FIG. 7 depicts an overview of an embodiment that analyzes whether multiple tracks are related and whether certain tracks should be processed together or separately.

In an embodiment, a graph may be used to provide a flexible methodology for determining whether tracks are related. For example, the graph may be defined to show relations between tracks based on kinematic similarities, such as physical proximity, multiple tracks, or similarity in maneuvers executed by multiple tracks. Some sensors, such as passive ES sensors, are unable to fully and accurately resolve target positions, being restricted to reporting the receipt of radiated signals of a certain character from a target at a undefined distance from the sensor appearing somewhere within a range of azimuth and elevation angles. If a precise positioning sensor such as a 3-dimensional radar is also surveilling this space and detects multiple targets within this space, it will be unclear which of the radar targets should be associated with the radiated signals reported by the ES equipment. The graph may be defined during the preprocessing stage so that is able to assist in disambiguating this situation by performing the association based on the likelihood of one or another of the radar targets being the source of the radiated signals based on prior kinematic observations. For example, the character of the observed radiated signals could be known a priori to be used by a certain adversary. In addition, of the multiple radar tracks, one of the tracks could be uniquely determined as being operated by that adversary, based on prior observations of that target as indicated by the current state of that target in the graph. Thus, in an embodiment the graph may be defined to determine if tracks are related (such as with nodes and links corresponding to the known radiated signals and known radar tracks for a particular adversary), and then the graph may be used to determine if any of multiple observed tracks are related.

If a determination is made that the tracks are unrelated, data relating to the different tracks may be separated and processed separately (block 840)—i.e., data for the first vehicle being tracked is input into the graph at an appropriate initial portion or at the current state node (if data for the vehicle has already been input into the graph), data from the second vehicle being tracked is input into the graph at an initial portion appropriate for the second vehicle or at the current state node, and so on for all the vehicles. Data for multiple unrelated tracks may be processed in essentially the same way as for a single track, by receiving initial real-time sensor data, determining if a reporting node was reached, and, if not, receiving updated real-time sensor data until a reporting node is reached. In an embodiment, processing for multiple unrelated tracks—which may include more than two tracks—may be performed in parallel within the graph, with the number of tracks that may be processed being limited only by the processing power available.

If a determination is made that the tracks are related (block 850) (whether by preprocessing or by using a graph to determine relatedness), data from both tracks may be useful when trying to classify each track individually using the graph. As will be understood, data concerning a missile—e.g. its size, speed, and acceleration characteristics—may help to identify the aircraft it was fired from if the data concerning the missile is unique or distinguishing. Similarly, data concerning an aircraft may help to identify what kind of missile it has fired. Accordingly, when classifying the aircraft using the graph, it will be useful to input both the data for the aircraft and the data for the missile into the graph, which may include the initial data for each of the aircraft and missile as well as any updated tracking data for each. Likewise, when classifying the missile using the graph, it will be useful to input both the data for the missile and the data for the aircraft into the graph. As will be understood, inputting data for more than one track will require that the graph be defined so that it can use the additional data. Therefore, when the graph is constructed as described herein, state nodes for the aircraft's signature may be defined that include missile characteristics and values as well as aircraft characteristics and values, and states nodes for the aircraft-fired missile's signature may be defined with aircraft characteristics and values as well as missile characteristics and values. In an example, a signature may be defined for an aircraft that includes state nodes and links that include a takeoff phase, a cruising phase, and a landing phase for the aircraft. As a missile firing will likely occur during the cruising phase, in an embodiment state nodes may be defined for the cruising phase that also include characteristics and values indicative of a missile firing. As will be understood, state nodes that include one or more characteristics and values for both the aircraft and a missile may be in addition to state nodes that represent cruising characteristics of the aircraft (without associated missile characteristics), as an aircraft does not always have to fire a missile while it is in its cruising phase. Defining and adding the additional state nodes to the graph allow the graph to handle both circumstances, and may allow quicker classification of both the missile and aircraft when two related tracks exist.

The disclosed method described herein may be automated by, for example, tangibly embodying a program of instructions upon a computer readable storage media capable of being read by machine capable of executing the instructions. A general purpose computer is one example of such a machine. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps herein may be performed automatically or wholly or partially in response to user command. An activity (including a step) performed automatically is performed in response to executable instruction or device operation without user direct initiation of the activity.

The systems and processes of FIGS. 1-7 are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

The pre-processing processes and steps may be performed by a system of computers, processors, memory, hardware, software, firmware, and the like, with networking or other communications connections between the different components of the system. The system for performing the pre-processing processes and steps may, in an embodiment, reside in a location that is remote from the sensors and associated equipment (e.g., computers, processors, memory, hardware, software, firmware) performing the real-time sensing of vehicle tracks. As will be understood, sensors may be based at a facility (such as a sensors at a ground-based facility or sensors on a satellite) or they may be based on a vehicle (such as on a submarine, plane, or ship). The sensor data from the variety of different sensors at different locations may be communicated via computer network (or other communications means) to the location where the graph is housed so that they can be input into the graph. In an embodiment the graph may be located on a computer system that is local to the primary vehicle or facility that is performing the real-time tracking. In another embodiment, the graph created in the pre-processing step may be remotely located from the primary vehicle or facility that is performing the real-time tracking. If the graph is remotely located, it may be accessible via computer network (or satellite communications or other known methods) by vehicles or facilities in need of the graph for real-time assessment.

The functions and steps provided in FIGS. 1-7 may be implemented using hardware (such as computers, memory, processors, and the like), software, firmware, and may reside on one or more computer systems located at one or more locations. In an embodiment in which different parts of the system (e.g., the part of the system for creating the graph and the part of the system for processing real-time sensor data) are remotely located from each other, a computer network, or other network capable of transmitting data and information (or even graphs or programming) between the different parts of the system, may be used to connect the different parts.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for classifying unclassified vehicle tracks using real-time sensor data comprising:

acquiring a computer database of vehicle track characteristics data for known vehicle tracks;

defining vehicle track signatures based on the vehicle track characteristics data including defining at least one relationship between a first vehicle track and a second vehicle track in which the first vehicle track and the second vehicle track are related;

generating a graph based on the vehicle track signatures, the graph having state nodes representative of distinguishing vehicle track characteristics defined in the vehicle track signatures and links between the state nodes representative of relationships between the distinguishing vehicle track characteristics defined in the vehicle track signatures, said graph also having reporting nodes for classifying unknown vehicle tracks when sufficient distinguishing vehicle track characteristics have been observed;

processing with the graph, using a processor, first real-time sensor data corresponding to a first unclassified vehicle track and second real-time sensor data corresponding to a second unclassified vehicle track by:

determining if the first unclassified vehicle track and the second unclassified vehicle track are related by kinematic analysis of the first real-time sensor data and the second real-time sensor data;

responsive to a determination that the first unclassified vehicle track and the second unclassified vehicle track are not related:

performing run-time processing to classify the first vehicle track by passing the first real-time sensor data through the graph until the first unclassified vehicle track is classified; and performing run-time processing to classify the second vehicle track by passing the second real-time sensor data through the graph until the second unclassified vehicle track is classified;

responsive to a determination that the first unclassified vehicle track and the second unclassified vehicle track are related:

performing run-time processing to classify the first vehicle track by passing the first real-time sensor data and the second real-time sensor data through the graph until the first unclassified vehicle track is classified;

performing run-time processing to classify the second vehicle track by passing the first real-time sensor data and the second real-time sensor data through the graph until the second unclassified vehicle track is classified.

2. The method for classifying vehicle tracks of claim 1 wherein defining vehicle track signatures further comprises:

identifying in the computer database the distinguishing vehicle track characteristics for at least some of the known vehicle tracks;

prioritizing the distinguishing vehicle track characteristics for at least some of the known vehicle tracks, wherein said prioritizing comprises defining relationships between the distinguishing vehicle track characteristics.

3. The method for classifying vehicle tracks of claim 2, wherein prioritizing the distinguishing vehicle track characteristics further comprises prioritizing the distinguishing vehicle track characteristics and defining the reporting nodes according to a probability analysis.

4. The method for classifying vehicle tracks of claim 2, wherein defining relationships between the distinguishing vehicle track characteristics comprises defining a relationship between the distinguishing vehicle track characteristics representative of the vehicle performing a known tactical maneuver.

5. The method for classifying vehicle tracks of claim 2, wherein defining at least one relationship between a first vehicle track and a second vehicle track in which the first vehicle track and the second vehicle track are related comprises defining at least one relationship between a first vehicle track and a second vehicle track in which one of the vehicle tracks is for a vehicle capable of launching an attack weapon and the other of the vehicle tracks is for a launched attack weapon.

6. The method for classifying vehicle tracks of claim 1, wherein the vehicle track characteristics data comprises at least one of speed, size, position, IFF status, heading, acceleration, airborne state, in motion state, operating altitude above or depth below sea level, likelihood of operating within a region of interest, acoustic response characteristics, electromagnetic emanation characteristics, kinematic maneuver characteristics, and electro-optic characteristics.

7. The method for classifying vehicle tracks of claim 1, wherein passing the first real-time sensor data through the graph until a reporting node is reached and the first unclassified vehicle track is classified comprises:

receiving first initial real-time sensor data for a first unclassified vehicle track and passing the first initial real-time sensor data through an initial portion of the graph to determine a first current track state for the first unclassified vehicle track;

determining whether one of said reporting nodes has been reached; and responsive to one of said reporting nodes being reached, classifying the first unclassified vehicle track; or responsive to one of said reporting nodes not being reached, receiving first updated real-time sensor data and passing the first updated real-time sensor data through an intermediate portion of the graph linked to a current track state to determine a first updated current track state, until one of said reporting nodes is reached and the first unclassified vehicle track is classified.

8. The method for classifying vehicle tracks of claim 7, wherein prioritizing the distinguishing vehicle track characteristics further comprises prioritizing the distinguishing vehicle track characteristics and defining the reporting nodes according to a probability analysis.

9. The method for classifying vehicle tracks of claim 7, wherein passing the second real-time sensor data through the graph until a reporting node is reached and the second unclassified vehicle track is classified comprises:

receiving second initial real-time sensor data for a second unclassified vehicle track and passing the second initial real-time sensor data through an initial portion of the graph to determine a second current track state for the second unclassified vehicle track; and receiving second updated real-time sensor data and passing the second updated real-time sensor data through an intermediate portion of the graph linked to the second current track state to determine a second updated current track state, until the second unclassified vehicle track is classified.

10. The method for classifying vehicle tracks of claim 9, wherein determining if the first unclassified vehicle track and the second unclassified vehicle track are related by kinematic analysis of the first real-time sensor data and the second real-time sensor data comprises determining if the first unclassified vehicle track and the second unclassified vehicle track are related by kinematic analysis of one or more of the first initial real-time sensor data, first updated real-time sensor data, second initial real-time sensor data, or second updated real-time sensor data.

11. The method for classifying vehicle tracks of claim 10, wherein, when the first unclassified vehicle track and the second unclassified vehicle track are related, passing the first real-time sensor data through the graph until the first unclassified vehicle track is classified comprises passing the first updated real-time sensor data in addition to the second updated real-time sensor data through the intermediate portion of the graph linked to the second current track state to determine a second updated current track state, until the second unclassified vehicle track is classified; and passing the second real-time sensor data through the graph until the second unclassified vehicle track is classified comprises passing the second updated real-time sensor data in addition to the first updated real-time data sensor to the intermediate portion of the graph linked to the first current track state to determine a first updated current track state, until the first unclassified vehicle track is classified.

12. The method for classifying vehicle tracks of claim 10, further comprising, when the first unclassified vehicle track and the second unclassified vehicle track are related,
passing, when the first unclassified vehicle track has been classified, a first vehicle track classification in addition to the second updated real-time sensor data through the intermediate portion of the graph linked to the second current track state to determine a second updated current track state, until the second unclassified vehicle track is classified; and
passing, when the second unclassified vehicle track has been classified, a second vehicle track classification in addition to the first updated real-time sensor data to the intermediate portion of the graph linked to the first current track state to determine a first updated current track state, until the first unclassified vehicle track is classified.

13. A method for pre-processing vehicle track characteristics data to define a graph for classifying unclassified vehicle tracks comprising:
acquiring a computer database of vehicle track characteristics data for known vehicle tracks;
identifying distinguishing characteristics for at least some of the known vehicle tracks;
prioritizing the identified distinguishing characteristics for at least some of the known vehicle tracks; and
generating a graph having state nodes representative of the identified distinguishing characteristics and links between the state nodes representative of the prioritizing of the identified distinguishing characteristics, said graph also having reporting nodes for classifying unclassified vehicle tracks when a sufficient number of distinguishing characteristics have been observed; and
prioritizing the distinguishing characteristics for at least some of the known vehicle tracks, wherein said prioritizing comprises defining at least one relationship between a first vehicle track and a second vehicle track in which one of the vehicle tracks is for a vehicle capable of launching an attack weapon and the other of the vehicle tracks is for the launched attack weapon.

14. The method for pre-processing vehicle track characteristics data of claim 13, wherein the vehicle track characteristics data comprises at least one of speed, size, position, IFF status, heading, acceleration, airborne state, in motion state, altitude above or depth below sea level, likelihood of operating within a region of interest, acoustic response characteristics, electromagnetic emanation characteristics, kinematic maneuver characteristics, and electro-optic characteristics.

15. The method for pre-processing vehicle track characteristics data of claim 13, wherein prioritizing the identified distinguishing characteristics further comprises prioritizing the identified distinguishing characteristics and defining the reporting nodes according to a probability analysis.

16. The method for pre-processing vehicle track characteristics data of claim 13, wherein defining relationships between identified distinguishing characteristics comprises defining a relationship between identified distinguishing characteristics representative of a vehicle performing a known tactical maneuver.

17. A computer system comprising:
a database of defined vehicle track signatures for known vehicle tracks;
a first computer processor for executing program instructions;
a first memory, coupled to the first computer processor, storing first program instructions which, when executed by the first computer processor, cause the first computer processor to:
identify distinguishing characteristics for at least some of the known vehicle tracks;
prioritize the identified distinguishing characteristics for at least some of the known vehicle tracks by defining at least one relationship between a first vehicle track and a second vehicle track in which the first vehicle track and the second vehicle track are related; and
generate a graph from the database of defined vehicle track signatures by defining state nodes corresponding to characteristics of the vehicle track signatures and defining links between defined state nodes, the links between the defined state nodes corresponding to defined vehicle track signatures;
a second computer processor coupled to the generated graph;
a second memory, coupled to the second computer processor, storing second program instructions which, when executed by the second computer processor, cause the second computer processor to:
determine if the first unclassified vehicle track and the second unclassified vehicle track are related, by kinematic analysis of the first real-time sensor data and the second real-time sensor data;
responsive to a determination that the first unclassified vehicle track and the second unclassified vehicle track are not related:
perform run-time processing to classify the first vehicle track by passing the first real-time sensor data through the graph until the first unclassified vehicle track is classified; and
perform run-time processing to classify the second vehicle track by passing the second real-time sensor data through the graph until the second unclassified vehicle track is classified;
responsive to a determination that the first unclassified vehicle track and the second unclassified vehicle track are related:
perform run-time processing to classify the first vehicle track by passing the first real-time sensor data and the second real-time sensor data through the graph until the first unclassified vehicle track is classified;
perform run-time processing to classify the second vehicle track by passing the first real-time sensor data and the second real-time sensor data through the graph until the second unclassified vehicle track is classified.

18. The computer system of claim 17, further comprising a third computer processor and third memory storing third program instructions which cause the third computer processor to define the vehicle track signatures for the known vehicle tracks using a probability analysis.

19. The computer system of claim 17, wherein the first memory stores program instructions which cause the first computer processor to define at least one relationship between a first vehicle track and a second vehicle track in which one of the vehicle tracks is for a vehicle capable of launching an attack weapon and the other of the vehicle tracks is for the launched attack weapon.

* * * * *